US012221805B2

(12) United States Patent
Zook

(10) Patent No.: US 12,221,805 B2
(45) Date of Patent: Feb. 11, 2025

(54) DAMPENING MECHANISM FOR TOUCH BAR EXIT DEVICE

(71) Applicant: PDQ Industries, LLC, Lancaster, PA (US)

(72) Inventor: Curtis Andrew Zook, Lancaster, PA (US)

(73) Assignee: PDQ Industries, LLC, Lancaster, PA (US)

( * ) Notice: Subject to any disclaimer, the term of this patent is extended or adjusted under 35 U.S.C. 154(b) by 129 days.

(21) Appl. No.: 18/171,781

(22) Filed: Feb. 21, 2023

(65) Prior Publication Data

US 2023/0265680 A1 Aug. 24, 2023

Related U.S. Application Data

(60) Provisional application No. 63/313,294, filed on Feb. 24, 2022.

(51) Int. Cl.
*E05B 17/00* (2006.01)
*E05B 65/10* (2006.01)

(52) U.S. Cl.
CPC ...... *E05B 17/0045* (2013.01); *E05B 17/0041* (2013.01); *E05B 65/1046* (2013.01)

(58) Field of Classification Search
CPC ............. E05B 17/0045; E05B 17/0041; E05B 65/1046; E05B 65/1053; E05B 65/106; E05B 65/1065; E05B 77/42; Y10T 292/0908
USPC ............................................................. 70/92
See application file for complete search history.

(56) References Cited

U.S. PATENT DOCUMENTS

| | | | | |
|---|---|---|---|---|
| 10,030,411 | B2 | 7/2018 | Coleman et al. | |
| 2013/0001960 | A1* | 1/2013 | Tien | E05B 17/2003 292/96 |
| 2016/0333621 | A1* | 11/2016 | Lehner, Jr. | E05F 11/54 |
| 2018/0148955 | A1* | 5/2018 | Yalamati | E05B 65/1046 |
| 2019/0352937 | A1 | 11/2019 | McKibben et al. | |

OTHER PUBLICATIONS

International Search Report and Written Opinion for International Application No. PCT/US2023/013470 dated May 17, 2023.
Unknown, "Allegion Product Profile, Sshh! Quite Solutions," Allegion.com,product brochure, 2 pages, Dec. 3, 2013.
Unknown, "Precision 2000 Series Touchbar Exit Devices," Best dormakaba Group, Product brochure 2 pages, Mar. 2022.

* cited by examiner

*Primary Examiner* — Christine M Mills
*Assistant Examiner* — Yahya Sidky
(74) *Attorney, Agent, or Firm* — Potomac Law Group, PLLC

(57) ABSTRACT

An embodiment is directed to a touch bar exit device for use on an exit door. The touch bar exit device include a touch bar and a link bar which moves as the touch bar is depressed. A return mechanism is mounted on the link bar. A damper mechanism is mounted on the link bar. The damper mechanism limits the travel of the link bar and the touch bar to dampen the sound of the touch bar exit device when the touch bar is depressed.

12 Claims, 5 Drawing Sheets

DAMPENING MECHANISM FOR TOUCH BAR EXIT DEVICE

CROSS REFERENCE TO RELATED APPLICATIONS

This application claims priority to U.S. Provisional Patent Application Ser. No. 63/313,294 filed on Feb. 24, 2022 which is incorporated herein by reference in its entirety.

FIELD OF THE INVENTION

The present invention is directed a dampening mechanism for a touch bar exit device which limits the movement of the touch bar and dampens the sound when the touch bar is used.

BACKGROUND OF THE INVENTION

The use of a touch bar assembly or push bar assembly can be noisy when in use. Most if not all manufacturers recognize the metal to metal contact of the touch bar assembly is loud/noisy. Current solutions to minimize noise is to use a rubber bumper between the metal pieces. However, the rubber bumper is not durable.

Other touch bar assemblies use a hydraulic damper. However, hydraulic dampers are expensive and can require maintenance. In addition, the hydraulic damper is not effective when the touch bar is depressed, it is only effective upon return of the touch bar.

It would, therefore, be beneficial to provide a mechanism to limit travel and dampen sound when the touch bar is depressed or extended and when the touch bar is retracted or moved back to its initial or original position. It would also be beneficial to provide a mechanism which can be used over many cycles, and which requires minimal maintenance.

SUMMARY OF THE INVENTION

An embodiment is directed to a dampening mechanism for a touch bar exit device which limits the movement of a touch bar of the touch bar exit device and dampens the sound of the touch bar. In various embodiments, the dampening mechanism has a dampening spring limits the movement of the touch bar. The dampening spring may have a high spring rate to control the movement of the touch bar. A spring block may be provided to engage the dampening spring and a return spring of the touch bar exit device.

An embodiment is directed to a touch bar exit device having a touch bar and a dampening mechanism. The dampening mechanism is configured to limit the movement of a touch bar and dampen the sound of the touch bar as the touch bar is moved. In various embodiments, the dampening mechanism has a dampening spring limits the movement of the touch bar. The dampening spring may have a high spring rate to control the movement of the touch bar. A spring block may be provided to engage the dampening spring and a return spring of the touch bar exit device.

An embodiment is directed to a touch bar exit device for use on an exit door. The touch bar exit device includes a touch bar and a link bar which moves as the touch bar is depressed. A return mechanism is mounted on the link bar. A damper mechanism is mounted on the link bar. The damper mechanism limits the travel of the link bar and the touch bar to dampen the sound of the touch bar exit device when the touch bar is depressed.

An embodiment is directed to a touch bar exit device for use on an exit door. The touch bar exit device includes a touch bar, a link bar and a back plate. The link bar moves as the touch bar is depressed The link bar is movable relative to the back plate. A return spring assembly is provided in engagement with the link bar and the back plate. A damper spring assembly is provided in engagement with the link bar and the back plate. A first spring rate of the damper spring assembly is higher than a second spring rate of the return spring assembly The damper mechanism limits the travel of the link bar and the touch bar to dampen the sound of the touch bar exit device when the touch bar is depressed.

Other features and advantages of the present invention will be apparent from the following more detailed description of the illustrative embodiment, taken in conjunction with the accompanying drawings which illustrate, by way of example, the principles of the invention.

DETAILED DESCRIPTION OF THE INVENTION

Figure 1:
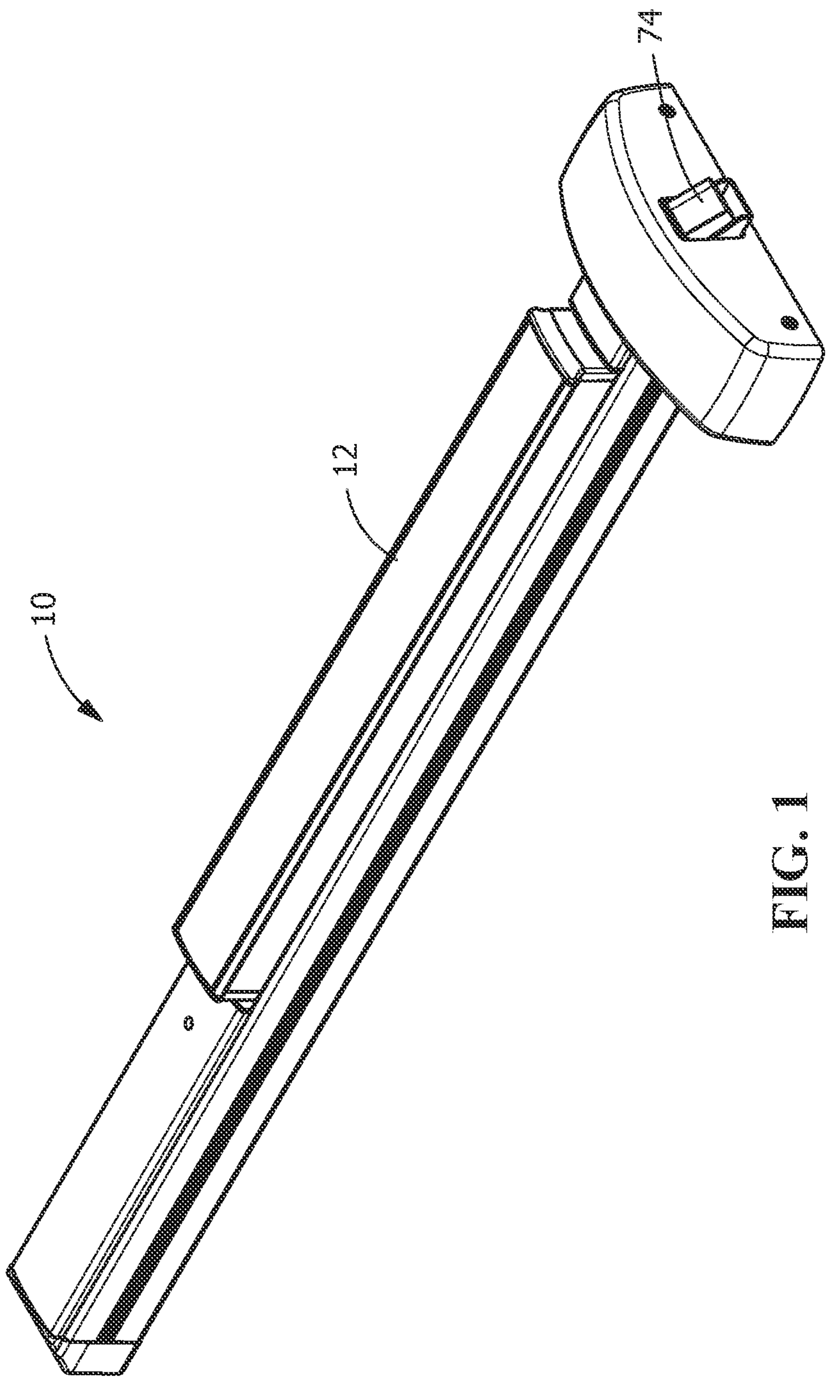
FIG. 1 is a perspective view of an assembled touch bar assembly of the present invention.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

As shown in FIG. 1, a touch bar exit device or push pad assembly 10 for use on an exit door is shown. While the touch bar exit device or push pad assembly is shown with a RIM device, the assembly may be used with other exit devices, including, but not limited to, vertical surface rods, concealed vertical rods and mortise exits.

Figure 2:
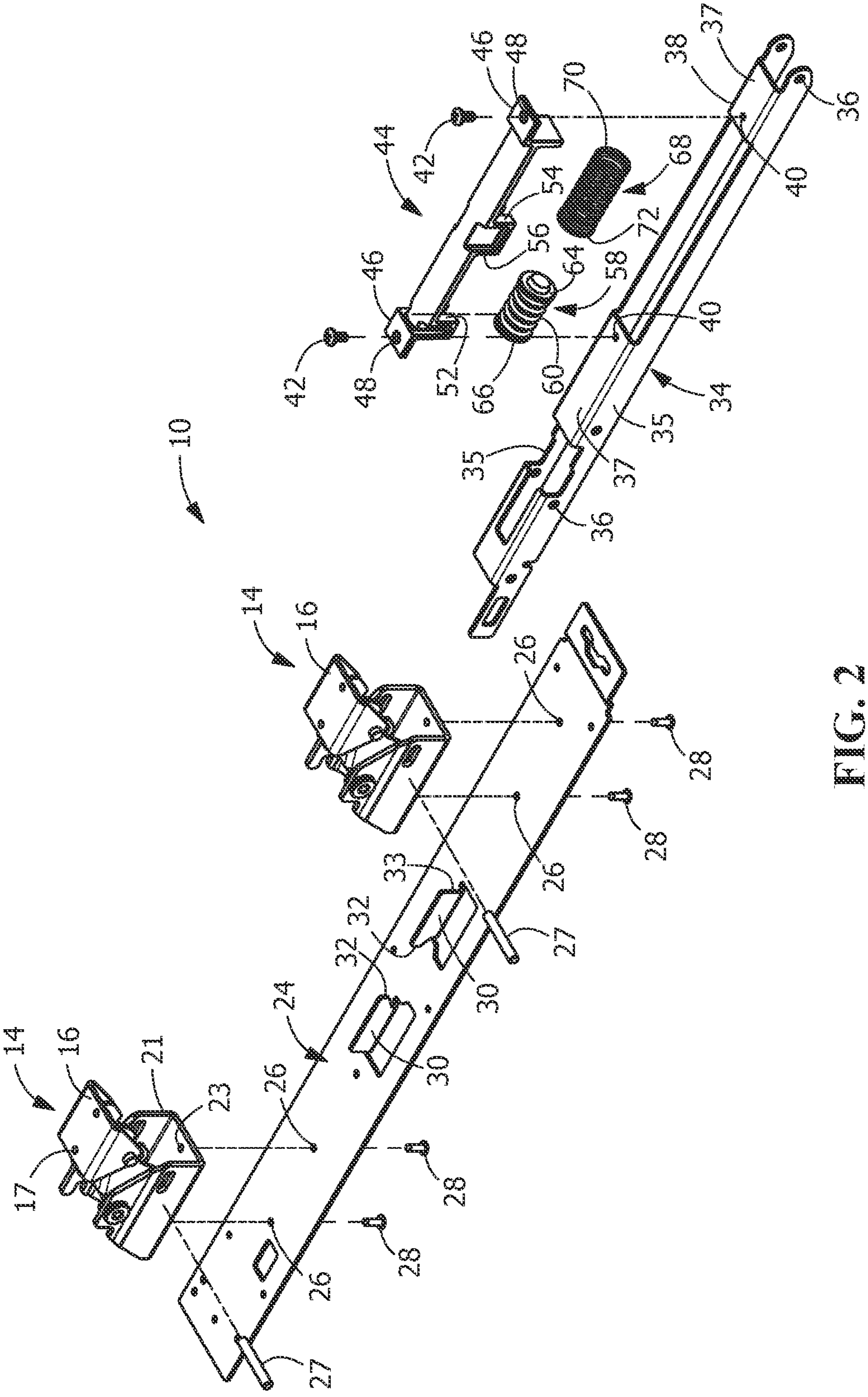
FIG. 2 is an exploded view of the touch bar assembly of FIG. 1.

As shown in FIGS. 1 and 2, the push pad assembly 10 includes, but is not limited to, a touch bar 12, touch bar scissor assemblies or touch bar scissors 14, a back plate 24, a link bar 34, a spring block 44, a damper mechanism or spring assembly 58, a return mechanism or spring 68 and a latch 74 (FIG. 1).

Figure 5:
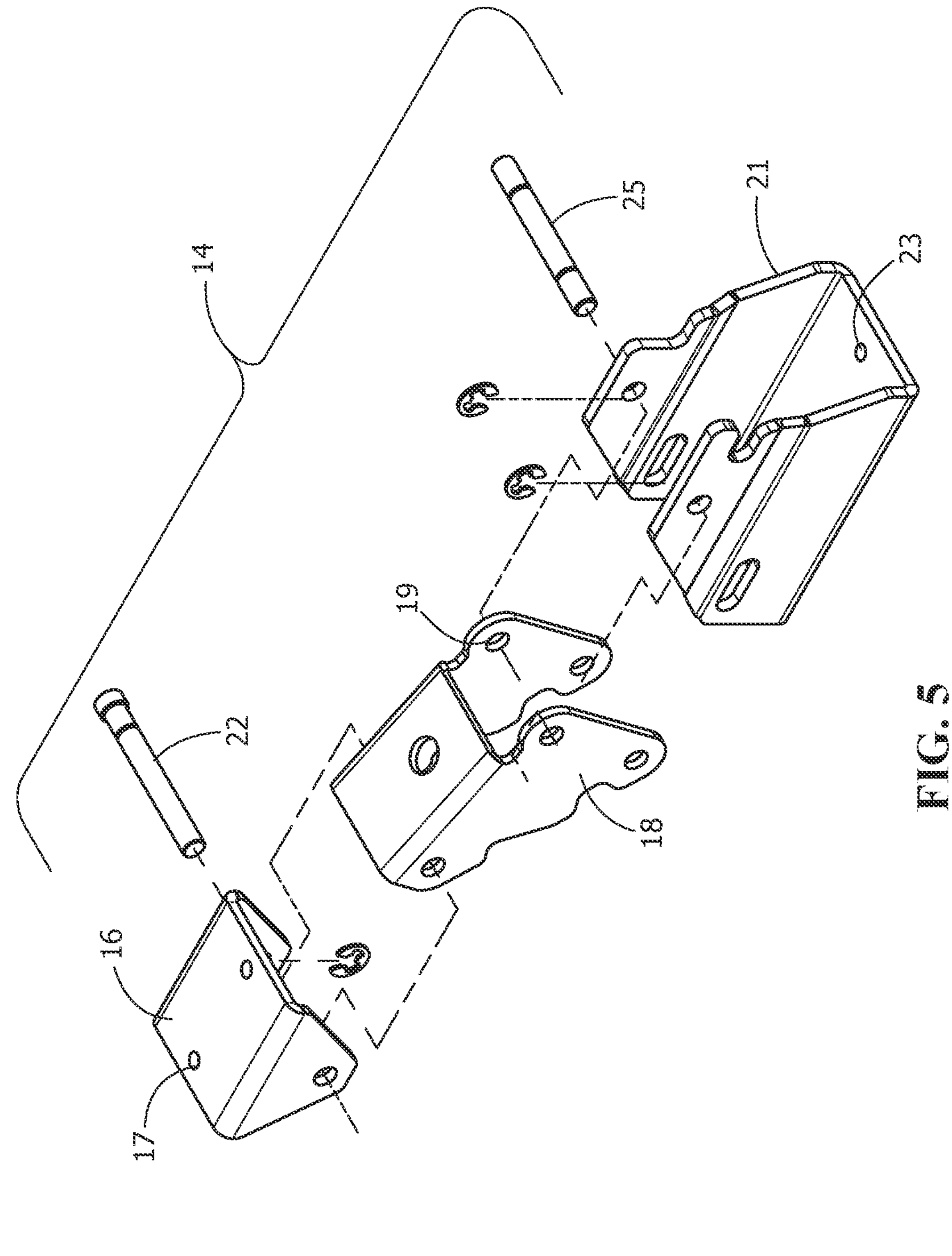
FIG. 5 is an exploded perspective view of a respective touch bar scissor assembly or rocker assembly.

As shown in FIG. 5, the touch bar scissor assemblies or touch bar scissors 14 have touch bar mounting portions 16 and link bar mounting portions 18. The touch bar mounting portions 16 are attached to the touch bar 12 by mounting hardware (not shown) which extends through mounting openings 17. Other methods of attaching the touch bar 12 to the touch bar scissors 14 may be used.

The link bar mounting portions 18 are attached to the touch bar mounting portions 16 through a pivot point 19 through which pins 22 extend. Each of the touch bar scissors 14 also include a mounting base 21. The link bar mounting portions are pivotally mounted to the mount bases by mounting pins 25. The mounting based 21 have mounting openings 23 which extend therethrough.

Figure 3:
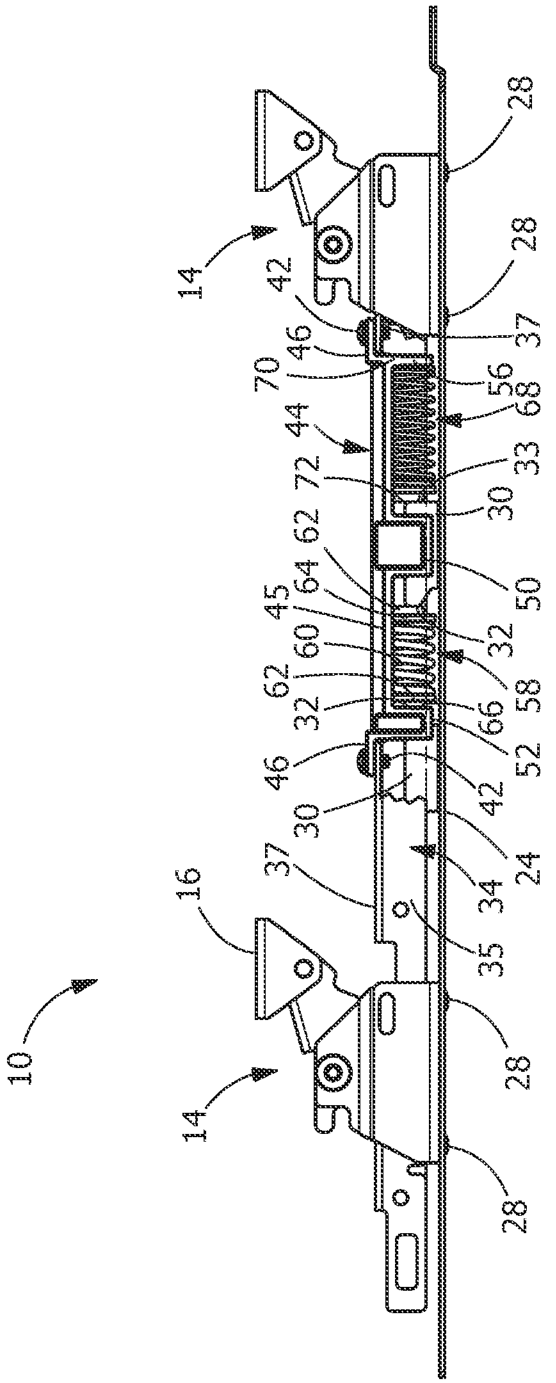
FIG. 3 is a partial cross sectional view of the assembled touch bar assembly of FIG. 1, with the touch bar removed, the touch bar assembly is shown in an initial or extended position.

As the touch bar mounting portions 16 are moved downward as viewed in FIG. 3, portions of the link bar mounting portions 18 are moved or pivoted to the left as viewed in FIG. 3. The operation of the touch bar scissors 14 is known in the industry.

In the illustrative embodiment shown in FIG. 2, the back plate 24 is a generally planar member. The back plate has mounting openings 26 which align with the mounting openings 23 of the respective mounting bases 21 of the touch bar scissors 14. Mounting hardware 28 extends through the mounting openings 26 and the mounting openings 23 to secure the touch bar scissors 14 to the back plate 24.

Damper spring mounting projections 30 extend from the back plate 24. The damper spring mounting projections 30 are positioned between the mounting openings 26 for the respective touch bar scissors 14. In the embodiment shown, the damper spring mounting projections 30 are planar members which extend essentially perpendicular to the back plate 24. The damper spring mounting projections 30 have ends 32 which are configured to cooperate with the damper spring assembly 58. A respective damper spring mounting projection 30 also has an end 33 which is configured to cooperate with the return spring 68. Other configurations of the damper spring mounting projections 30 may be used.

Figure 4:
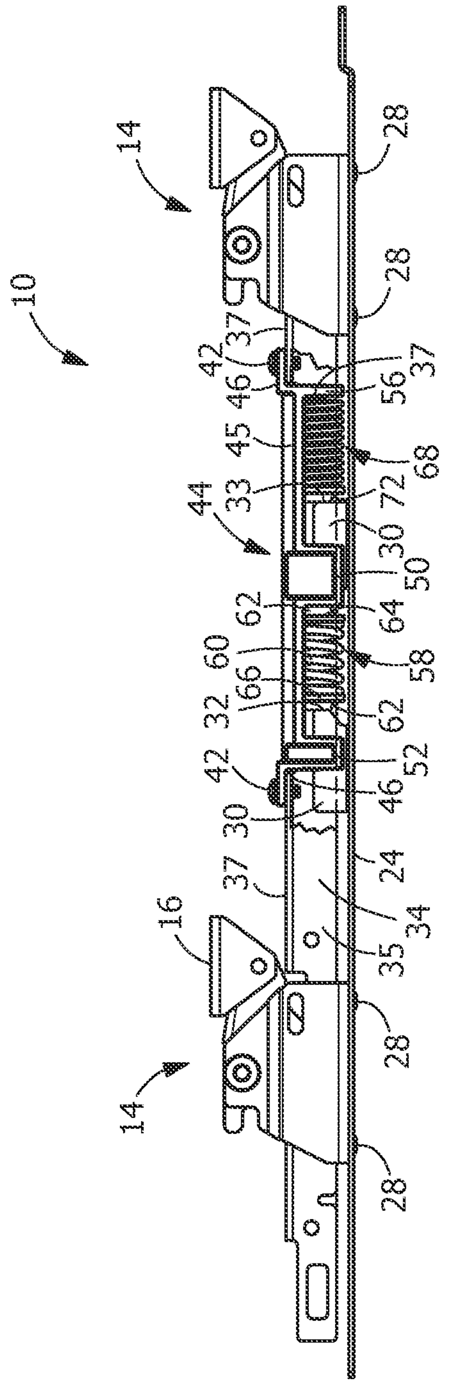
FIG. 4 is a partial cross sectional view of the assembled touch bar assembly of FIG. 1, with the touch bar removed, the touch bar assembly is shown in an engaged or retracted position.

As shown in FIG. 4 the link bar 34 extends between the touch bar scissors 14. In the embodiment shown, the link bar extends beyond a respective touch bar scissor. The link bar 34 is not directly attached to the back plate 24 and is movable relative to the back plate 24. In the illustrative embodiment shown in FIG. 3, the link bar 34 has two side members 35 and connecting members 37 which connect the side members 35 together. The side members 35 extend essentially perpendicular to the back plate 24 and the connecting members 37 are spaced from and are essentially parallel to the back plate 24. Other configurations of the link bar 34 may be used.

Mounting openings 36 are provided in the link bar 34. The mounting openings 36 allow pins 27 to be inserted therethrough to attach the link bar 34 to the link bar mounting portions 18 of the touch bar scissors 14. Consequently, the link bar 34 will move as the link bar mounting portions 18 are moved.

Spring block mounting portions 38 are provided on the connecting members 37. The spring block mounting portions 38 have mounting openings 40 to receive mounting hardware 42 to secure the spring block 44 to the link bar 34.

The spring block 44 has a generally planar portion 45. When assembled the planar portion 45 extends essentially parallel to the block plate 24. Link bar mounting portion 46 with mounting openings 48 are provided on or proximate to the generally planar portion 45. The link bar mounting portion 46 and the mounting openings 48 align with the spring block mounting portions 38 and the mounting openings 40 to allow the mounting hardware 42 to secure the spring block 44 to the link bar 34.

The spring block 44 has a first damper spring engagement projection 50, a second damper spring engagement projection 52 and a return spring engagement projection 56. As shown in FIGS. 2 through 4, the first damper spring engagement projection 50, the second damper spring engagement projection 52 and the second return spring engagement projection 56 extend in direction which is essentially perpendicular to the axis of the planar portion 45 of the spring block 44. Other configurations of the spring block 44 may be used.

The damper spring assembly 58 has a damper spring 60 with spring block engagement members 62. The spring block engagement members 62 are provided at a first damper spring engagement end 64 and an oppositely facing second damper spring engagement end 66.

As shown in FIG. 3, when the push pad assembly 10 is not engaged or in an initial unstressed position, the spring block engagement members 62 of the damper spring assembly 58 are in engagement with the ends 32 if the damper spring mounting projections 30 to retain the damper spring 60 and the damper spring assembly 58 in position relative to the back plate 24.

The damper spring 60 has a relatively high spring rate as compared to the return spring 68. In an illustrative embodiment the spring rate of the damper spring 60 is between approximately 210 lbf/in and approximately 250 lbf/in, and more particularly approximately 230 lbf/in. However, other spring rates can be used. The damper spring 60 can be selected based on the spring rate, thereby allowing the push pad assembly 10 to be tuned for a particular application.

As shown in FIG. 3, when the push pad assembly 10 is not engaged or in the initial unstressed position, a first return spring engagement end 72 of the return spring 68 engages the end 33 of the respective damper spring mounting projection 30, and a second return spring engagement end 70 of the return spring 68 engages the second return spring engagement projection 56 of the spring block 44. This retains the return spring 68 in position relative to the back plate 24.

The return spring 68 has a relatively low spring rate as compared to the damper spring 60. In an illustrative embodiment the spring rate of the return spring 68 is between approximately 6 lbf/in and approximately 8 lbf/in, and more particularly approximately 7.2 lbf/in. However, other spring rates can be used. The return spring 68 can be selected based on the spring rate, thereby allowing the push pad assembly 10 to be tuned for a particular application.

In one illustrative embodiment, the damper spring 60 has an overall length of approximately 1.05 inches and an outside diameter of approximately 0.72 inches, with 6 total coils and 4 active coils. The return spring 68 has an overall length of approximately 2.15 inches and an outside diameter of approximately 0.72 inches, with 13 total coils and 11 active coils. However, other shapes and sized of spring can be used.

In various embodiment, the damper spring 60 may be replaced by other devices or materials which exhibit the same or better dampening characteristics. For example, polyurethane and felt may be used.

In operation, the push pad assembly 10 is attached to a door (not shown) as is known in the industry. When the door is to be opened, the touch bar 12 of the push pad assembly 10 is pushed or depressed. As the touch bar 12 is depressed, the touch bars scissors 14 are engaged, causing the link bar mounting portions 18 to move in a direction which is transverse to the motion of the touch bar 12. In the illustrative embodiment shown in the FIGS. 3 and 4, the link bar mounting portions 18, and the link bar 34 which is attached thereto, are moved to the left as the touch bar is depressed.

As the link bar 34 is moved, the spring block 44, which is attached to the link bar 34, is also moved. The movement of the spring block 44 causes the second return spring engagement projection 56 of the spring block 44 to engage the second return spring engagement end 72 of the return spring 68. As this occurs, the movement of the link bar 34 and the touch bar 12 is permitted to continue, as the spring rate of the return spring 68 is not sufficient to prevent the movement of the link bar 34 or the touch bar 12 when a typical force is applied to the touch bar 12.

Movement of the link bar 34 and the touch bar 12 continues until the first damper spring engagement projection 50 of the spring block 44 engages the spring block engagement member 62 of the damper spring assembly 58 on the first damper spring engagement end 64. As this occurs, the force required to move the link bar 34 and the touch bar 12 is significantly increased, as the movement is opposed by both the return spring 68 and the damper spring 60. As the damper spring 60 has a high spring rate, the force that must be applied to the touch bar 12 must be substantially increased to allow the movement to continue.

In general, the latch 74 will disengage from the opening (not shown) in the door frame (not shown) prior to or approximately that same time as the first damper spring engagement projection 50 of the spring block 44 engages the spring block engagement member 62 of the damper spring assembly 58.

When engaged, the damper spring 60 dampens or prevents the continued movement of the link bar 34 and the touch bar 12. The use of the damper spring 60 limits the travel of the link bar 34 and the touch bar 12, thereby dampening the sound when the touch bar 12 is depressed, as the components (in particular the metal components) of the push pad assembly will be prevented from engaging each other with significant force.

When the touch bar 12 is disengaged, the compression force applied to the return spring 68 and the damper spring 60 is removed, allowing the return spring 68 and the damper spring 60 to return toward their unstressed position. As this occurs, the second return spring engagement end 72 of the return spring 68 remains in engagement with the second return spring engagement projection 56 of the spring block 44 to return the link bar 34 and the touch bar 12 to their initial position. Initially, of the damper spring 60 has been engaged, the first damper spring engagement end 64 of the damper spring 60 engages the first damper spring engagement projection 50 of the spring block 44 to additionally facilitate the return the link bar 34 and the touch bar 12 to their initial position.

Return movement of the link bar 34 and the touch bar 12 continues until the second damper spring engagement projection 52 of the spring block 44 engages the spring block engagement member 62 of the damper spring assembly 58 on the second damper spring engagement end 66 of the damper spring 60. As this occurs, the force required to move the link bar 34 and the touch bar 12 is significantly increased, as the return movement is opposed by both the damper spring 60. Consequently, as the damper spring 60 has a high spring rate, the damper spring 60 dampens or the return movement of the link bar 34 and the touch bar 12. The use of the damper spring 60 limits the travel of the link bar 34 and the touch bar 12, thereby dampening the sound when the touch bar 12 is returned to the initial position, as the components (in particular the metal components) of the push pad assembly will be prevented from engaging each other with significant force.

While the invention has been described with reference to an illustrative embodiment, it will be understood by those skilled in the art that various changes may be made, and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A touch bar exit device for use on an exit door, the touch bar exit device comprising:
- a touch bar;
- a link bar which moves as the touch bar is depressed;
- a return mechanism mounted on the link bar, the return mechanism has a return spring with a second spring rate;
- a damper mechanism mounted on the link bar, the damper mechanism has a damper spring with a first spring rate;
- damper spring mounting projections extending from a back plate of the touch bar exit device, the damper spring mounting projections having first ends which are configured to cooperate with the damper mechanism;
- a spring block provided on the link bar, the spring block having a first damper spring engagement projection, a second damper spring engagement projection and a return spring engagement projection;
- a first return spring engagement end of the return mechanism engages a second end of the respective damper spring mounting projection, and a second return spring engagement end of the return mechanism engages the return spring engagement projection of the spring block to retain the return mechanism in position relative to the back plate;
- wherein the damper mechanism dampens the sound of the touch bar exit device when the touch bar is depressed or when the touch bar is disengaged.

2. The touch bar exit device as recited in claim 1, wherein a first spring rate of the damper spring is higher than a second spring rate of the return spring.

3. The touch bar exit device as recited in claim 2, wherein touch bar scissor assemblies connect the touch bar to the link bar.

4. The touch bar exit device as recited in claim 3, wherein touch bar scissor assemblies are mounted to a back plate.

5. The touch bar exit device as recited in claim 4, wherein the link bar extends between two touch bar scissor assemblies, the link bar is movable relative to the back plate.

6. The touch bar exit device as recited in claim 5, wherein the damper spring has spring block engagement members, the spring block engagement members are provided at a first damper spring engagement end and an oppositely facing second damper spring engagement end.

7. The touch bar exit device as recited in claim 6, wherein when the touch bar is not engaged, the spring block engagement members of the damper spring are in engagement with the first ends of the damper spring mounting projections to retain the damper spring in position relative to the back plate.

8. The touch bar exit device as recited in claim 3, wherein a respective damper spring mounting projection of the damper spring mounting projections has a second end which is configured to cooperate with the return spring assembly.

9. The touch bar exit device as recited in claim 2, wherein the damper spring has a spring rate of between approximately 210 lbf/in and approximately 250 lbf/in.

10. The touch bar exit device as recited in claim 2, wherein the return spring has a spring rate of between approximately 6 lbf/in and approximately 8 lbf/in.

11. A touch bar exit device for use on an exit door, the touch bar exit device comprising:

a touch bar;

a link bar which moves as the touch bar is depressed;

a back plate, the link bar is movable relative to the back plate;

a return spring assembly provided in engagement with the link bar and the back plate;

a damper spring assembly provided in engagement with the link bar and the back plate;

damper spring mounting projections extending from the back plate, the damper spring mounting projections having first ends which are configured to cooperate with the damper spring assembly;

a spring block provided on the link bar, the spring block having a first damper spring engagement projection, a second damper spring engagement projection and a return spring engagement projection;

a first return spring engagement end of the return spring assembly engages a second end of a respective damper spring mounting projection, and a second return spring engagement end of the return spring assembly engages the return spring engagement projection of the spring block to retain the return spring assembly in position relative to the back plate;

wherein a first spring rate of the damper spring assembly is higher than a second spring rate of the return spring assembly;

wherein the damper spring assembly dampens the travel of the link bar and the touch bar to dampen the sound of the touch bar exit device when the touch bar is depressed or disengaged.

12. The touch bar exit device as recited in claim 11, wherein touch bar scissor assemblies are mounted on the back plate and connect the touch bar to the link bar.

* * * * *